United States Patent [19]
Raynham et al.

[11] Patent Number: 5,747,889
[45] Date of Patent: May 5, 1998

[54] REDUNDANT POWER SUPPLY AND STORAGE SYSTEM

[75] Inventors: Michael B. Raynham, Los Gatos; Myron R. Tuttle, Santa Clara, both of Calif.

[73] Assignee: Hewlett-Packard Company, Palo Alto, Calif.

[21] Appl. No.: 688,912

[22] Filed: Jul. 31, 1996

[51] Int. Cl.$^6$ .................................................. H02J 3/06
[52] U.S. Cl. ........................ 307/80; 307/25; 307/64; 307/65; 364/492; 364/707
[58] Field of Search ........................ 307/80, 25, 43, 307/29, 34, 65, 64; 364/707, 492

[56] References Cited

U.S. PATENT DOCUMENTS

| | | | |
|---|---|---|---|
| 3,755,686 | 8/1973 | Woods | 307/18 |
| 3,979,599 | 9/1976 | Amemiya | 307/29 |
| 5,045,712 | 9/1991 | Baggenstoss | 307/29 |
| 5,202,618 | 4/1993 | Nishimura | 323/270 |
| 5,266,838 | 11/1993 | Gerner | 307/19 |

*Primary Examiner*—William M. Shoop, Jr.
*Assistant Examiner*—Albert W. Paladini
*Attorney, Agent, or Firm*—Denise A. Lee

[57] ABSTRACT

The present invention provides a low cost, low complexity, redundant power supply for an electronic data system. The low complexity of the system minimizes system failure rate while the redundancy improves system availability. The redundant power supply interconnect system is comprised of: a first electronic device including a first power supply; a second electronic device including a control means, a second power supply and a third power supply, wherein the first power supply means of the first electronic device is electrically coupled to the control means of the second electronic device; a first dedicated bus electrically coupling the first electronic device to the second electronic device; and a first serial management bus, the first serial management bus electrically coupling the first electronic device to the control means of the second electronic device.

13 Claims, 8 Drawing Sheets

| PGOOD | SENSE# | ON#/(OFF) | STANDBY VOLTAGE | FAULT/STATUS |
|---|---|---|---|---|
| 1 | 1 | | | NO SUPPLY INSTALLED |
| 0 | 0 | 0 | 1 | NORMAL |
| 0 | 0 | 0 | 1 | POWER SUPPLY FAULT |
| 0 | 0 | | 0 | LINE VOLTAGE FAULT |

SOME HOT AIR RE-CIRCULATION

FIGURE 9B

REDUNDANT POWER SUPPLY AND STORAGE SYSTEM

BACKGROUND OF THE INVENTION

Reliability is critical in systems that control the transfer and storage of data. One factor effecting the reliability of electronic data systems is power interruption to the electronic data system. For example, power interruption to volatile memory devices can result in the loss of data to those memory devices. Reliability is also effected by loss of data due to single point failures based on failure to build in redundancy or backup systems into the electronic data systems.

Figure 1:
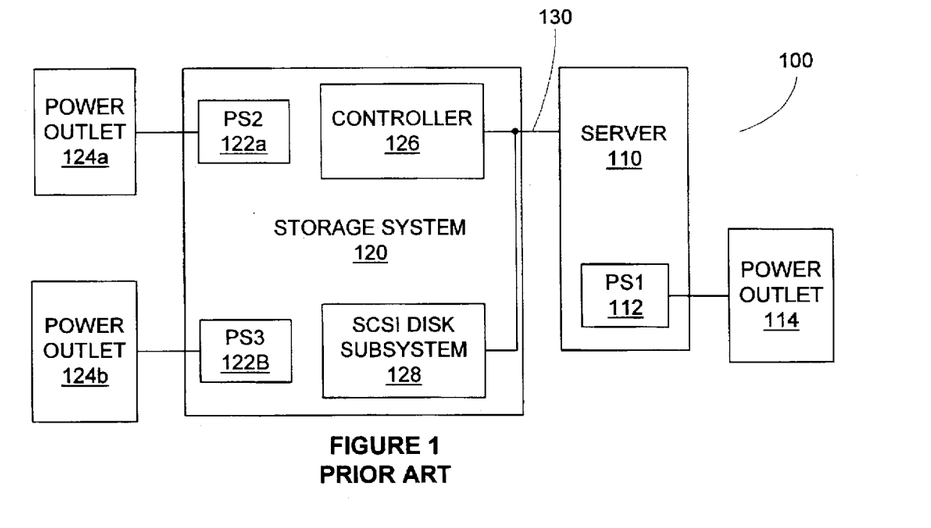
FIG. 1 shows a block diagram of an electronic data storage system having redundant power supplies.

System availability can be improved by introducing redundant power supplies into the electronic data system. This reduces data loss due to power interruption caused by failure of the power supply itself. Referring to FIG. 1 shows a block diagram of an electronic data system 100 whose storage system has redundant power supplies. The electronic data system 100 includes (1) a server 110 whose power supply 112 is electrically connected to power outlet 114 and (2) an electronic data storage system 120 having redundant power supplies 122a, 122b connected to power outlets 124a, 124b. The data storage system 120 includes a management controller 126 and a SCSI disk subsystem 128 which are electrically connected to the server via a SCSI bus 130. Although the system shown in FIG. 1 does not include a management bus since the SCSI bus is used for that function, in an alternative embodiment a management bus may be provided on the unused pins of the SCSI bus. However, the management bus configuration has limited functionality and is dependent on whether duplex or single SCSI bus model configuration is used and also on whether a narrow or wide SCSI bus model configuration is used.

Figure 2:
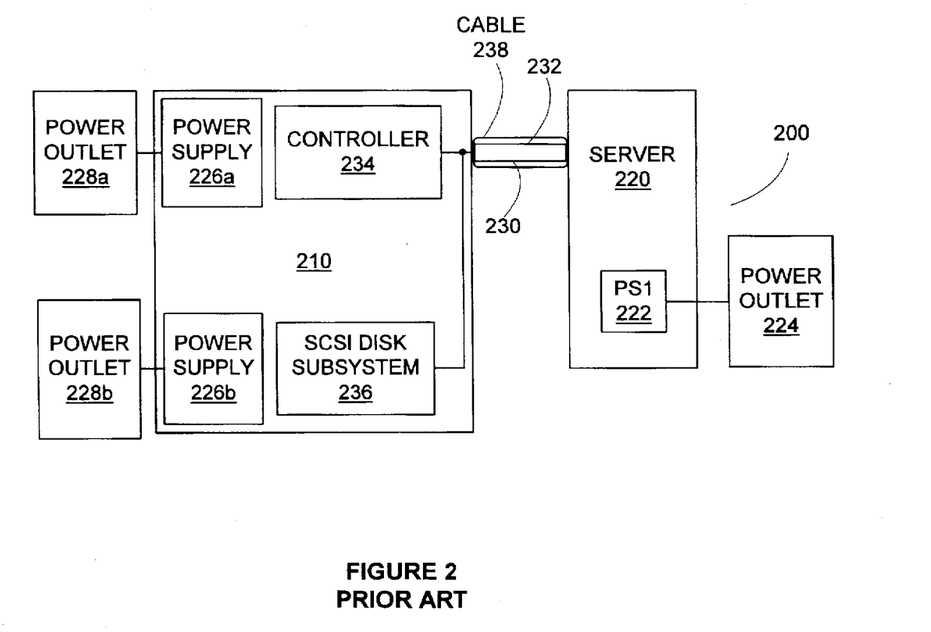
FIG. 2 shows a block diagram of an electronic data system with power supply redundancy.

Referring to FIG. 2, there is shown a block diagram of an electronic data system 200 wherein a storage system 210 is electrically coupled to a server 220 via a management bus 230 and a SCSI bus 232. The storage system 210 has redundant power supplies 226a, 226b which are electrically connected to power outlets 228a, 228b. The server 220 is powered by a power supply 222 connected to a power outlet 224. The management controller 234 and the SCSI disk subsystem 236 of the storage system 210 are electrically coupled to server 220 via a SCSI cable 238. The management bus 230 and the SCSI bus 232 are combined on a single cable 238.

Although the electronic data systems in FIGS. 1 and 2 have redundant power supplies to guard against data loss due to power supply failures, the configuration of these data systems makes them susceptible to single point failures. The electronic data system shown in FIG. 1 relies on the SCSI bus itself being operational for the remote storage system management from the server to function. In the electronic data system shown in FIG. 2, the SCSI bus and management bus are combined on a single cable. In a typical system, the interconnections between system components, including cables, form the least reliable part of the system. Since the single cable does not provide for system redundancy, if the cable fails there can be no communication between the SCSI bus and the server. Similarly the management bus is not redundant, therefore if the cable fails there can be no communication between the storage system management bus and the server.

The two primary reasons for power interruption to electronic data systems are: (1) failure of the power supply and (2) failure of the line voltage input. Failure of the power supply is typically caused by a defect in the power supply and is overcome through the use of redundant power supplies. Failure of the line voltage input is typically caused by either a temporary power outage or the accidental movement of the line cord of the storage system so that the power line is removed from the power outlet.

Figure 3A:
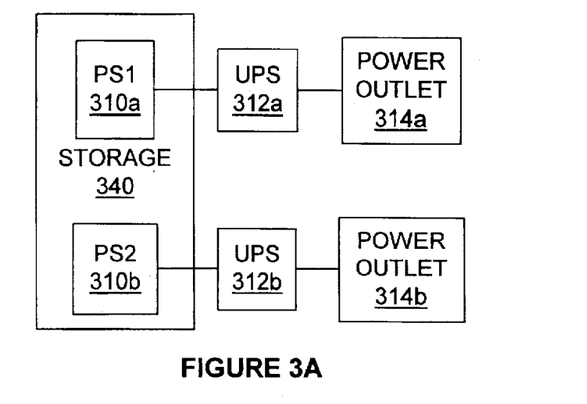
FIG. 3A shows a first UPS- power supply configuration for power supply protection for an electronic data system.
Figure 3B:
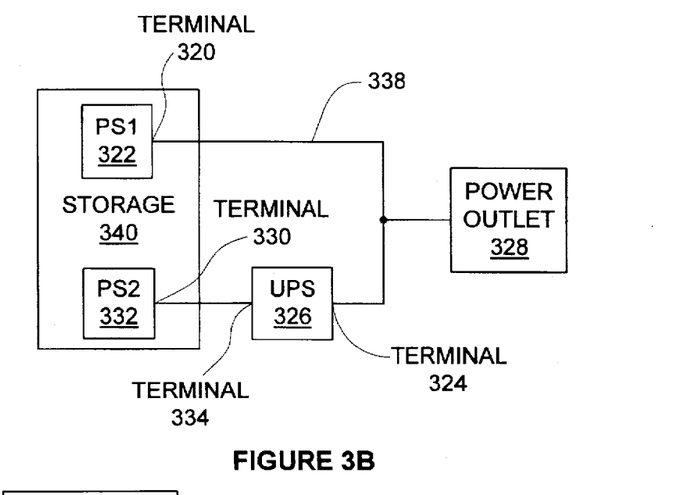
FIG. 3B shows a second UPS- power supply configuration for power supply protection for an electronic data system.
Figure 3C:
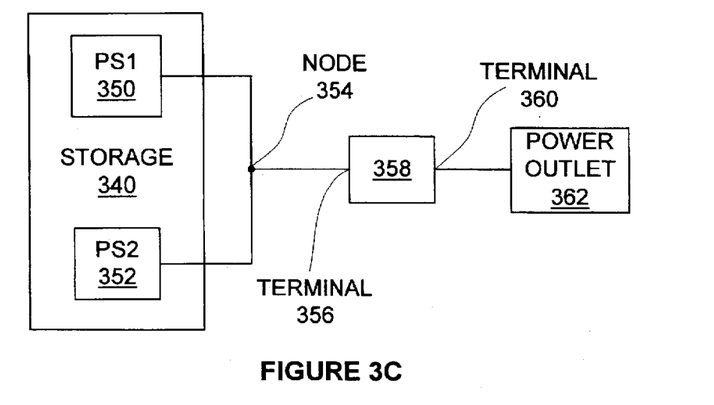
FIG. 3C shows a third UPS- power supply configuration for power supply protection for an electronic data system.

Although the systems shown in FIGS. 1 and 2 provide for solutions due to power supply failures, they do not provide solutions for line voltage input failures. FIGS. 3A–3C provide for system configurations that mediate problems resulting from line voltage failures by using at least a first UPS (uninterruptable power supply). FIG. 3A shows a first configuration where each power supply 310a, 310b is electrically connected to a corresponding UPS 312a, 312b and a corresponding power outlet 314a, 314b. Although this configuration provides both protection against power supply and line input failures, it is expensive to implement and results in increased warranty failures as there are more components in the overall system.

An alternative UPS system configuration is shown in FIG. 3B. In the embodiment shown in FIG. 3B, a first terminal 320 of the first power supply 322 is connected to a first terminal 324 of the UPS 326 and to the power outlet 328. A first terminal 330 of the second power supply 332 is connected to a second terminal 334 of the UPS 326. In the configuration shown in FIG. 3B, the UPS provides power in the case of power interruption due to a line input failure. Further, in the case of failure by the UPS 326, line 338 is available to the storage system 340 as a source of power.

FIG. 3C shows an alternative UPS redundant power configuration. In the configuration shown in FIG. 3C, a first power supply 350 and a second power supply 352 are connected in parallel at node 354. Node 354 is connected to a first terminal 356 of a UPS 358. The second terminal 360 of the UPS 358 is connected to a power outlet 362. The configuration shown in FIG. 3C provides power in the case of power interruption due to a line input failure. Further, if either power supply 350 or 352 fails, then power will still be supplied to the storage system. However, in the event of a UPS 358 failure, power will not be provided to the storage system resulting in data loss.

Another problem with current power supply systems is that when the power supply fails no diagnostic tests can be performed. Although systems utilizing a UPS have monitored the status of the UPS, current systems do not monitor the power supply and in the case of power interruption do not identify the type of power interruption, i.e., whether the power supply or line voltage input has failed. Further, current redundant power supply systems do not allow for power supply failures to be checked remotely. This results in a service support engineer being sent out to do trouble shooting or fault diagnosis. However, if the trouble shooting data were made available to the engineer, this analysis could be done remotely. Further, existing storage systems do not always provide the ability for the server to remotely power cycle the storage system—it is either too expensive or just too impractical. This is important as power cycling the storage system is the common method, and sometimes the only method of resetting the SCSI subsystem.

Existing storage systems use very complex redundant power supply solutions that are frequently very expensive, and do not provide adequate management features for complete remote management. Further reliability problems are incurred due to single point failures due to system configuration. The complexity added to improve system reliability, while not affecting system uptime significantly, does affect warranty failure rate cost significantly. A low cost redundant power supply which can be remotely monitored and which improves system availability is needed.

SUMMARY OF THE INVENTION

The present invention provides a low cost, low complexity, redundant power supply for an electronic data system. The low complexity of the system minimizes system failure rate while the redundancy improves system availability. The redundant power supply interconnect system is comprised of: a first electronic device including a first power supply; a second electronic device including a control means, a second power supply and a third power supply, wherein the first power supply means of the first electronic device is electrically coupled to the control means of the second electronic device; a first dedicated bus electrically coupling the first electronic device to the second electronic device; and a first serial management bus, the first serial management bus electrically coupling the first electronic device to the control means of the second electronic device.

In the preferred embodiment, the first electronic device is a server and the second electronic device is a storage system, the storage system having redundant power supplies. Management of the electronic storage system including its redundant power supplies is provided by an internal control means. The control means also has access to the external management bus that connects the storage system to the server.

The redundant power supply interconnection has built in redundancy of power supplies, protecting the system against power supply failure. Further, the power supply from the server is coupled to the control means of the server providing further power supply redundancy. Thus in the event of a power failure to the storage system, power will be supplied from the server. The power supplied to the storage system from the server as a backup power source provides immunity from management bus cable segment single point failures and management bus/storage system controller power failures.

The server power supply acts as a backup source of power for the storage system. Thus when the storage system power fails, diagnostic tests can still be performed on the storage system to determine the type of power interruption, i.e. whether the power supply or line voltage input has failed. These tests can be performed remotely. Further, server backup power for the storage system provides the ability for the server to remotely power cycle the storage system. This is important, since power cycling the storage system is the most common method of resetting the SCSI subsystem.

A further understanding of the invention described herein may be realized by reference to the remaining portion of the specification and the attached drawings.

DETAILED DESCRIPTION OF THE PREFERRED EMBODIMENTS

Figure 4:
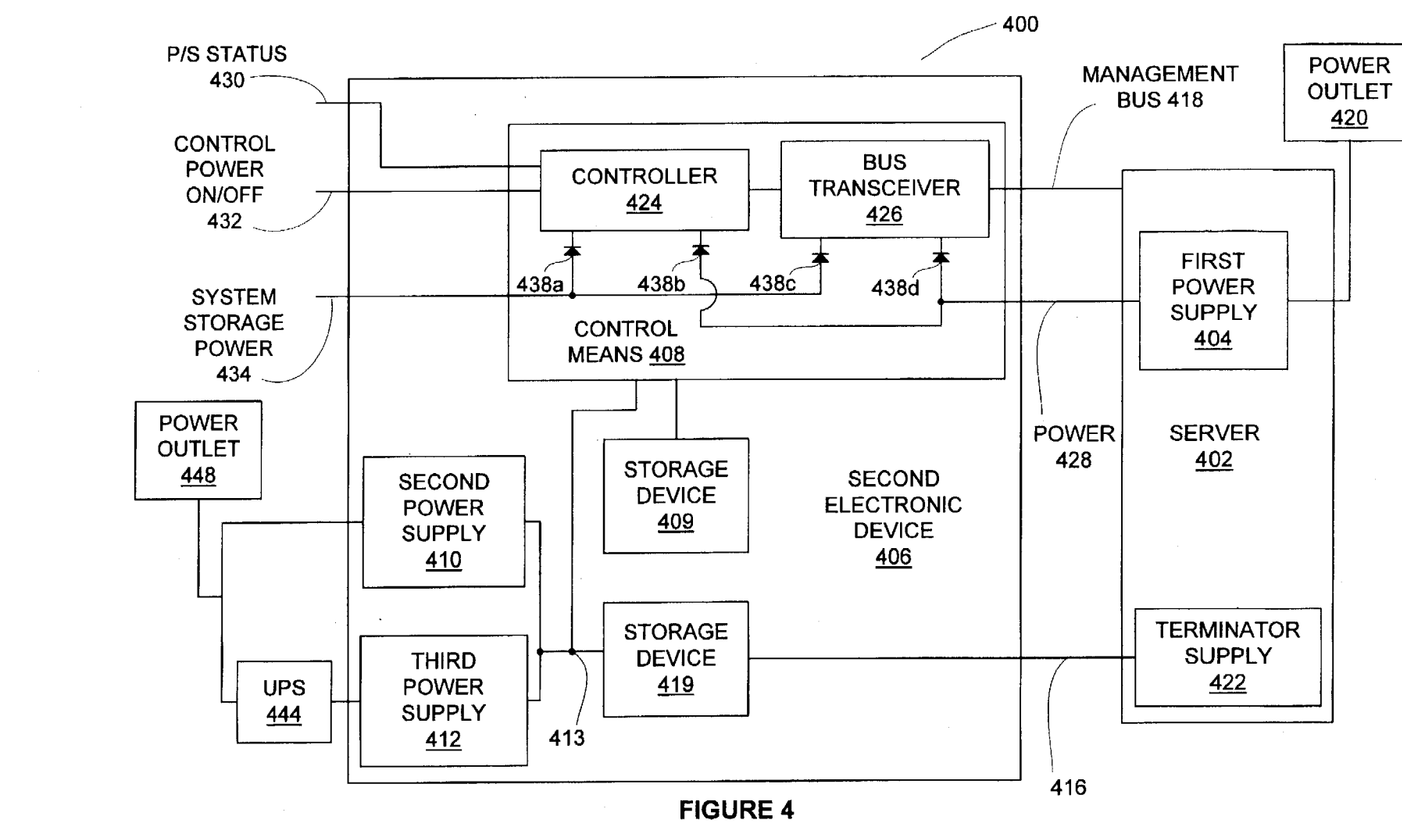
FIG. 4 shows the preferred embodiment of the present invention.

Referring to FIG. 4 shows a first preferred embodiment of the redundant power supply interconnection system according to the present invention. The redundant power supply interconnect system 400 is comprised of: a first electronic device 402 including a first power supply 404; a second electronic device 406 including a control means 408, a second power supply 410 and a third power supply 412, wherein the first power supply 404 of the first electronic device 402 is electrically coupled to the control means 408 of the second electronic device 406; a first dedicated bus 416 electrically coupling the first electronic device 402 to the second electronic device 406; and a first management bus 418, the first management bus 418 electrically coupling the first electronic device 402 to the control means 408 of the second electronic device 406.

The electronic interconnection system includes a first electronic device 402 and a second electronic device 406. In the preferred embodiment, the first electronic device 402 is a server and the second electronic device 406 is a storage system. The server 402 includes a first power supply 404, typically 5.6 volts, which is electrically coupled to the storage system 406. The first power supply 404 is electrically coupled to a first power supply outlet 420. The server 402 further typically includes a terminator supply 422 which has a typical output voltage value of 4.5 volts. In the preferred embodiment, the terminator supply 422 is electrically coupled to the storage devices 419 in the storage system 406 by a dedicated bus 416. In the preferred embodiment, the dedicated bus 416 is a SCSI bus.

The second electronic device 406, the storage system, typically includes storage devices 419 and redundant power supplies 410, 412 for improving electronic data system availability. In one embodiment of the electronic data system, the storage devices 419 includes six 4 Gbyte disk drives, a CD-ROM drive, and a DAT tape back up drive (not individually shown). Management of the electronic storage system 406 including its redundant power supplies 410, 412 is provided by an internal control means 408. The internal control means typically includes a central processing unit (CPU), memory, I/O ports for system interface and has an external clock source (now shown). The control means 408 is electrically coupled to the first power supply 404 of the server 402 and also, to the management bus 418 which connects the storage system 406 to the server 402. The management bus 418 provides I²C clock and data as well as a 5.6 volt supply (for driving OR-ing diodes used in a five volt system) from an I/O card (not shown) in the server 402.

The control means 408 is typically comprised of a controller 424 and an I²C bus transceiver 426, and the power supply bus 428. The controller 424 is typically a 83C751 I²C controller. The 83C751 I²C controller 424 provides a connection to the server management bus 418 for remote access. Additionally, the controller 424 controls the power supplies, i.e. on-off, power cycle, shut down, power system auto recovery and output status to the power management board and the power switch LEDs. Further, the controller 424 also detects power supply present, line voltage and power supply failure, and log faults. OR-ing diodes 438a, 438b, 438c, 438d are coupled between the controller 424 and the I²C bus transceiver 426. The OR-ing diodes are used for combining power for the controller 424 and the management bus transceiver 426 from the external management bus 5.6 volt supply 425 and/or the power supply standby voltage 5.6 volt supply.

In addition to being electrically coupled to the management bus 418, the control means 408 is also coupled to the power bus 428 from the server 402. The power bus 428 provides a back up source of power for the storage system 406. I/O lines 430, 432, 434 provide control and information about the status of the control means 408 of the storage system 406. Line 430 provides the status of the power line. Line 432 controls the power on/off of the power supply. Line 434 shows the status of the storage system power supply.

Figure 5:
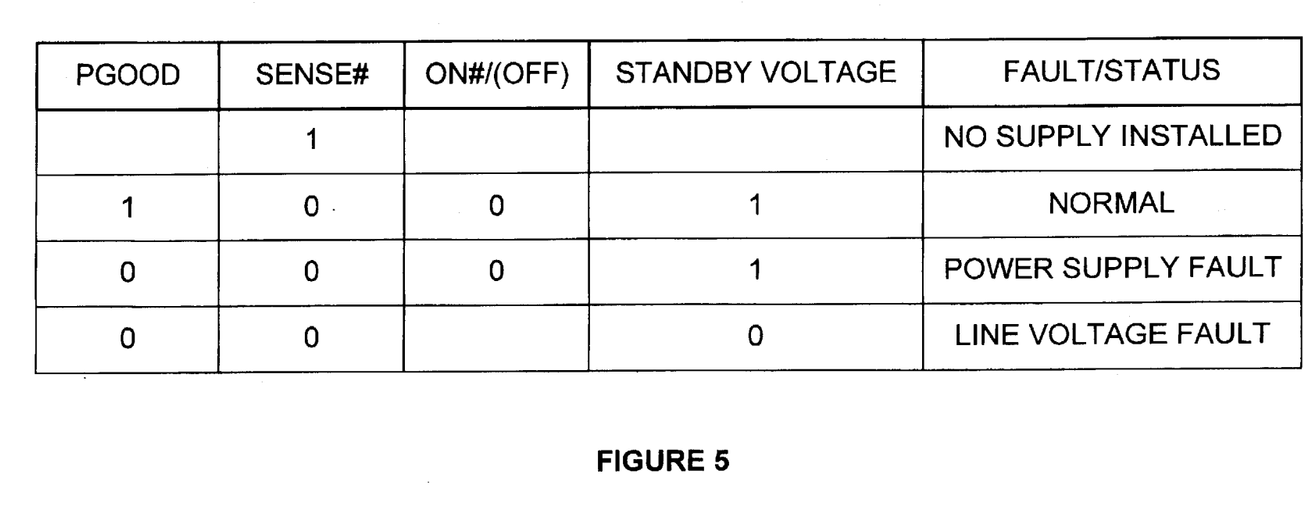
FIG. 5 shows a table listing the fault diagnosis for the redundant power supply system according to the present invention.

The control means 408 outputs commands and reads the status of the redundant power supplies 410, 412. The faults are diagnosed according to the table shown in FIG. 5. Referring to FIG. 5, a power supply fault indicates that the power supply has shut down due to an error condition. Recovery of the power supply at issue is achieved by the controller cycling the ON/OFF control corresponding to the power supply at issue. A line voltage fault means either that the power supply is set to the wrong line voltage, that the line power is off, or that the line cord is faulty. The control means 408 indicates on a user interface the condition, allowing the system user to tell where the failure is. The control means 408 monitors lines from the power supply and monitors standby voltage. In addition, the control means 408 indicates if the primary or secondary power supply is functional.

In the preferred embodiment, the controller is electrically coupled to a memory means 409 used for data logging system information. Preferably the memory means is an EEPROM. The EEPROM can provide additional server management functions including such as storage system line voltage drop-out and other power related failure logging for failure trend prediction, as well as unit number management, self-test, display control and other system related tasks.

The redundant power supply of the storage system 406 includes at least a power supply 410 and a power supply 412. In the preferred embodiment, the power supplies 410 and 412 are connected with internal OR-ing diodes 710, 712 (see FIG. 7A) so that one line 413 can be shared by both power supplies 410 and 412. Power supplies 410 and 412 are electrically coupled to both storage devices 419 and the control means 408.

Figure 6:
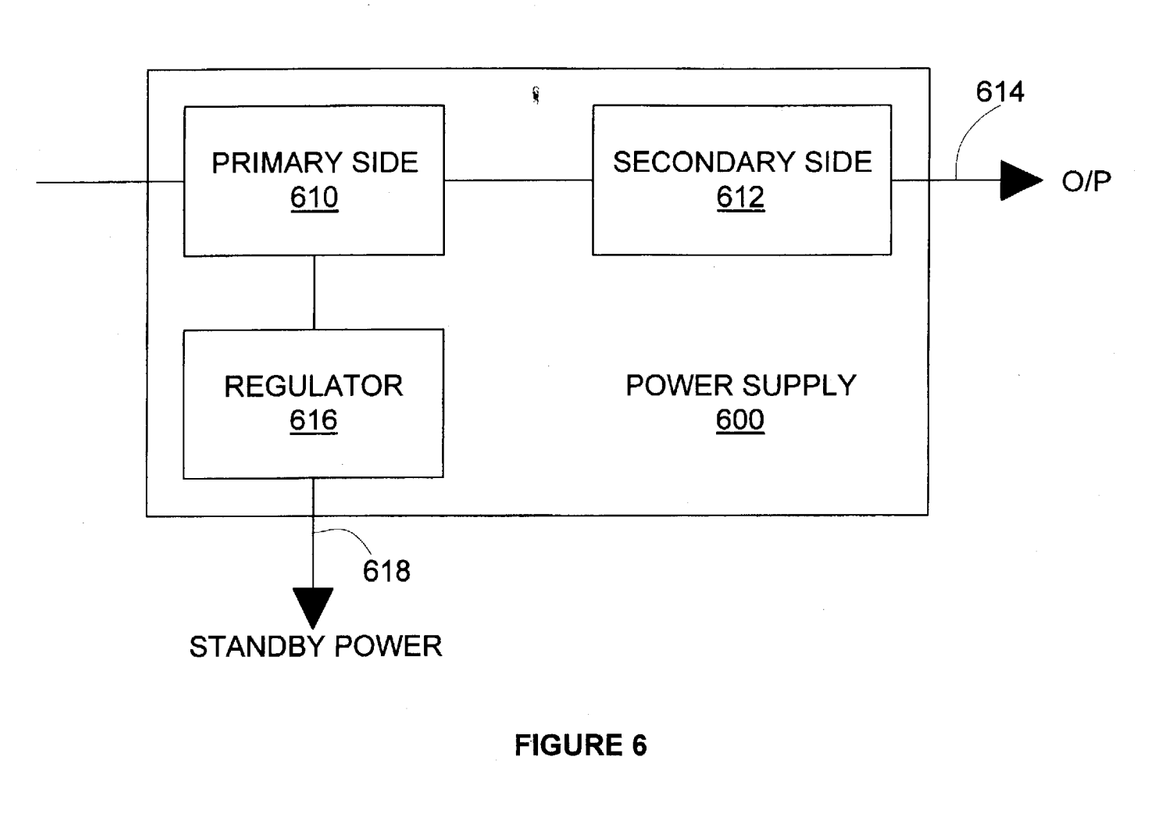
FIG. 6 show a block diagram of a power supply whose outputs include output and stand by voltages.

Each power supply 410, 412 has its own control and power status lines (not shown; cf. FIG. 6). In the present embodiment, the control and power status lines are as follows: Power good-output indicating power supply output is valid; Power Supply Sense Output- output indication of whether a power supply is present; Remote ON/OFF- input low voltage control for the power supply; and Standby Power Supply Output- is always on if the line voltage is present and the power supply primary circuit is active, otherwise the Standby Power Supply Output indicator is off.

In the embodiment shown in FIG. 4, only the interconnection of the output power line of power supplies 404, 410 and 412 is shown. FIG. 6 shows a block diagram of a power supplies 410 and 412 which include the Pgood and Standby power outputs in addition to the output power line. The power supply 600 includes a primary side 610 and a secondary side 612. The primary side 610 is coupled to a regulator 616. The output of the regulator is the Standby power line 618. The output of the secondary side 612 is the output power 614. Power line Pgood 622 indicates whether or not the power supply is functioning. The Standby power line 618 monitors the auxiliary power supply that runs the primary side of the power supply. The standy power line 618 should be active as long as the line current is active and can be used to tell if the line voltage is active. We can use this scenario to detect line faults. The power line Pgood can be used to tell whether there is a power supply failure.

Figure 7A:
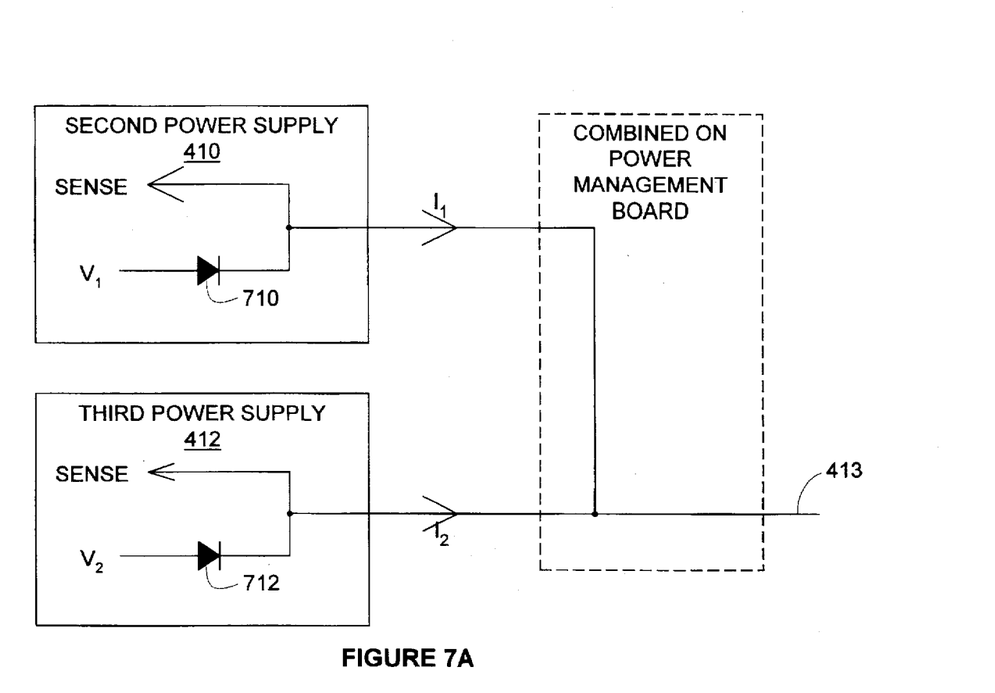
FIG. 7A shows a balanced power distribution configuration for redundant power supplies according to the preferred embodiment of the present invention.

FIG. 7A shows a balanced power distribution configuration for redundant power supplies according to an embodiment of the present invention. In FIG. 7A, internal ORing diodes 710, 712 are used so that one line can shared by both power supply 410 and 412. By using a "balanced" power distribution on the power management board and setting V1, V2 so the nominal output voltage Vout (at line 413) is within 1 mV at the P/S factory and using the same type of diodes for diode 710 and 712, the currents $I_1$ and $I_2$ are matched typically within the 40% to 60% range without using active current sharing. The voltage sense may be from both sides of the OR-ing diode and the percentage adjusted for optimum transient response and regulation.

Figure 7B:
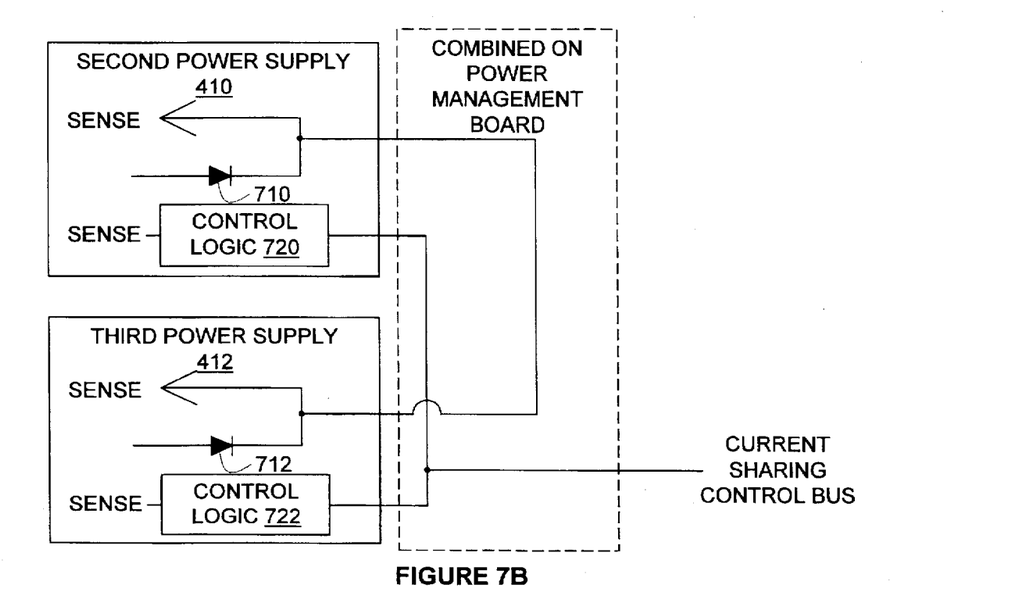
FIG. 7B shows an active current sharing configuration for redundant power supplies according to an alternative embodiment of the present invention.

FIG. 7B shows an active current sharing configuration for redundant power supplies according to an alternative embodiment of the present invention. Current sharing is typically used to divide the load so that the internal power dissipated in each power supply is approximately equal (efficiency approximately 15%). This minimizes the temperature rise of the components and helps improve the reliability of each power supply. Although there are benefits to using active current sharing, active current sharing requires additional connections between each power supply. The additional connections between each power supply and the additional supporting control logic 720, 722 in the power supply reduce reliability of the redundant power supply system.

The redundant power supply interconnection has built in redundancy of power supplies, protecting the system against power supply failure. For example, in the event of failure of power supply 410, power supply 412 will supply power to the storage system 406. Similarly, in the event of failure of power supply 412, the power supply 410 will supply power to the storage system 406.

Although redundant power supplies provide system power in the event of a power supply failure, they do not provide system power in the event of power interruption due to line voltage. Thus, in the preferred embodiment, the redundant power supplies are electrically coupled to a UPS 444 which is coupled to an outlet 448 (FIG. 4). Although, the interconnection shown in FIG. 4 shows a UPS interconnection as is seen in FIG. 3B, other interconnections, such as the UPS interconnections shown in FIG. 3A and 3C are also possible. Using the UPS makes the probability of a power system failure in a 1+1 configuration very small. (A 1+1 configuration is a N+1 redundant system, where N=1). Therefore, the need for an expensive (and potentially less reliable) battery back up on individual subsystems is diminished.

Further, the power supply 404 of the server 402 is coupled to the control means 408 of the storage system 406 providing further power supply availability. Power supplied to the storage system control means 408 thus comes from: 1) the power supplies (410, 412) of the storage system 406 and 2) power bus 428. Thus in the event of a power failure to the storage system 406, power will be supplied from the server 402. The power supplied to the storage system 406 from the server as a backup power source provides immunity from management bus cable segment single point failures and management bus/storage system controller power failures.

The preferred embodiment of the present invention uses a SCSI bus 416 to interconnect the terminator supply 422 to the storage device. However, one problem with using SCSI bus 416 is when the system locks up, it is difficult to get the bus 416 to unlock without power cycling the system. However, in the event of power interruption to the system, there is no power available to power cycle the system (on/off). Prior systems required battery backup to guard against the loss of power to the controller. In the present invention, because of the interconnection to the server power supply, power cycling can be used, for example, to re-initialize the SCSI devices in the storage system.

In the present invention, the server power supply 404 acts as a backup source of power for the storage system. Thus when power to the storage system 406 is interrupted, diagnostic tests can still be performed on the storage system 406 to determine the type of power interruption, i.e. whether the power supply or line voltage input has failed. These tests can be performed remotely. Further, server backup power for the storage system 406 provides the ability for the server to remotely power cycle the storage system. This is important, since power cycling the storage system is the most common method of resetting the SCSI subsystem. In addition to being used for re-initializing SCSI devices, power cycling allows for complete remote management of server sites. Use of the I²C controller in combination with the server supply as a backup source of power allows for remote control of the management bus, the local control panel, the power supply control and status lines for controlling, diagnosing, and providing fault recovery for the redundant power supplies in a storage system or server.

Figure 8:
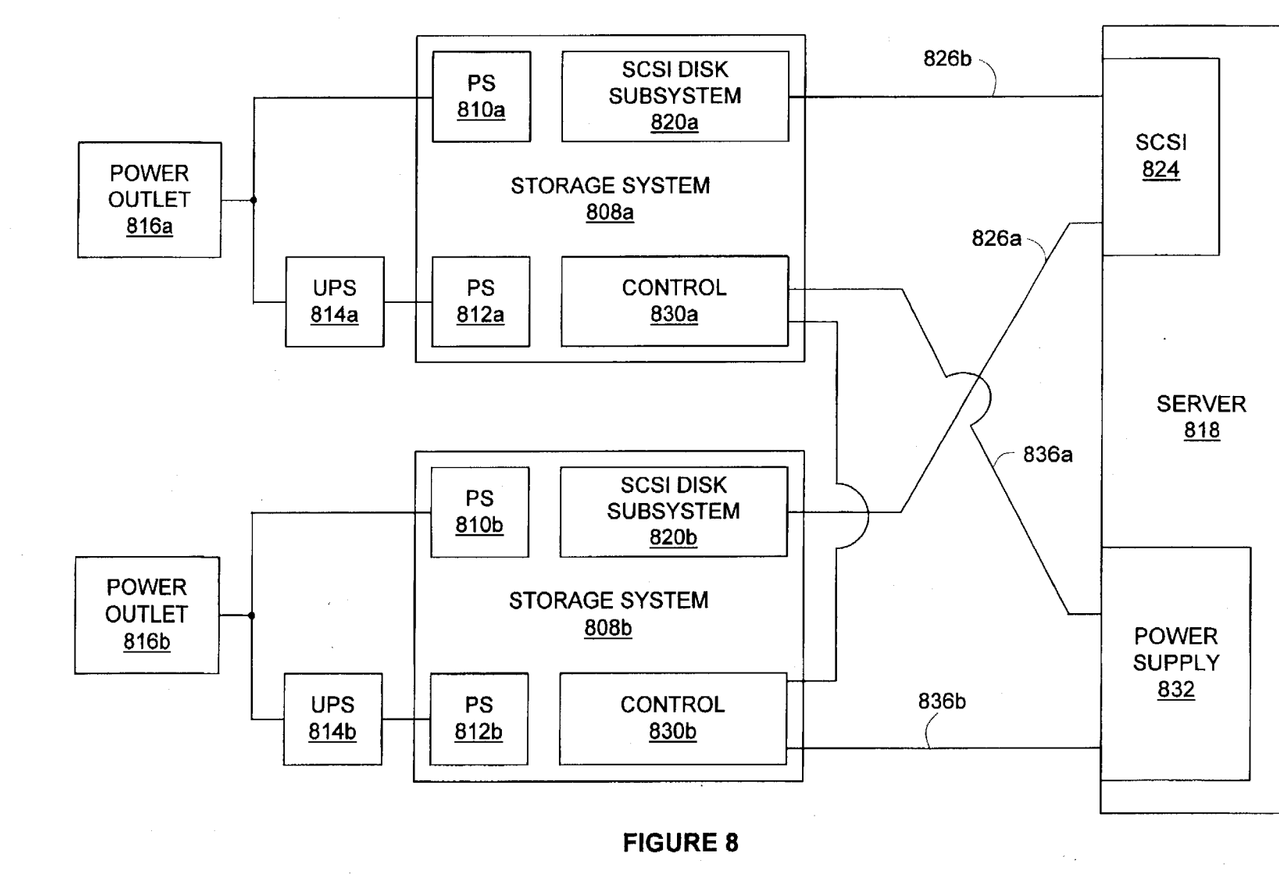
FIG. 8 shows a loop configuration for multiple storage devices using the interconnection configuration according to the present invention.

The embodiment shown in FIG. 4 is for a single storage system 406, however a plurality of storage systems may be connected to the server 402. FIG. 8 shows a loop configuration for multiple storage devices using the interconnection configuration according to the present invention. Both storage systems 808a, 808b include redundant power supplies 810a, 810b and 812a, 812b connected to a UPS 814a, 814b which is electrically coupled to an outlet 816a, 816b, respectively. Both storage systems 808a, 808b are connected to the server 818. Both SCSI disk subsystems 820a and 820b are connected to the SCSI subsystem 824 of the server 818 via SCSI buses 826a and 826b.

In addition, the control means 830a and 830b of the storage systems 808 are electrically coupled to the power supply 832 of the server 818. In FIG. 4, separate lines are used for the management bus 418 and power line 428. To simplify FIG. 8, a single power-management bus cable 836 which includes both a management bus and power line is drawn, instead of drawing a separate management bus and power line. Thus, power-management bus cable 836a a includes a first management bus which electrically couples the first electronic device (server 818) to the second electronic device (first storage systems 808a). Power-management bus cable 836a also includes a power bus which electrically couples the power bus of the power-management bus cable 836a to the control means 830a of the second electronic device 808a. Similarly, power-management bus cable 836b includes a second management bus which electrically couples the server 818 to the third electronic device (second storage system 808b). Power-management cable 836b also includes a power bus which electrically couples the power bus of the power-management bus cable 836b to the control means 830b of the second storage system 808b.

Control means 830a is electrically coupled to the power supply 832 via power-management bus cable 836a. Control means 830b of the second storage system 808b is electrically coupled to the power supply 832 of the server 818 via power-management bus cable 836b. Further, control means 830a is electrically coupled to control means 830b by a cable 836c. Thus if either power-management bus cables 836a, 836b, or 836c fail or is disconnected, the power-management bus cable, and thus both the management bus and power bus, is still functional.

The loop configuration shown in FIG. 8 has n=2 storage systems. However, dependent on the server capabilities, the server may be connected to more than two storage systems. A loop configuration of n storage systems, requires n+1 cables to interconnect the n storage systems to the server. A first cable electrically couples the controller of a first storage system to the power supply of the server and a second cable electrically couples the controller of the storage system back to the server. The other n−1 cables are between controllers of the different storage systems.

If appropriate measures are taken to avoid single point failures, i.e. connecting one power supply to the UPS and the other to line voltage (to avoid UPS single point failures), and connecting the management bus from the server in a loop configuration as provided (to avoid management bus segment failures) the probability of being unable to diagnose hardware problems remotely via the management bus is very small. Both for internal and external management bus use, two connectors are always provided to allow a redundant loop to be connected.

Figure 9A:
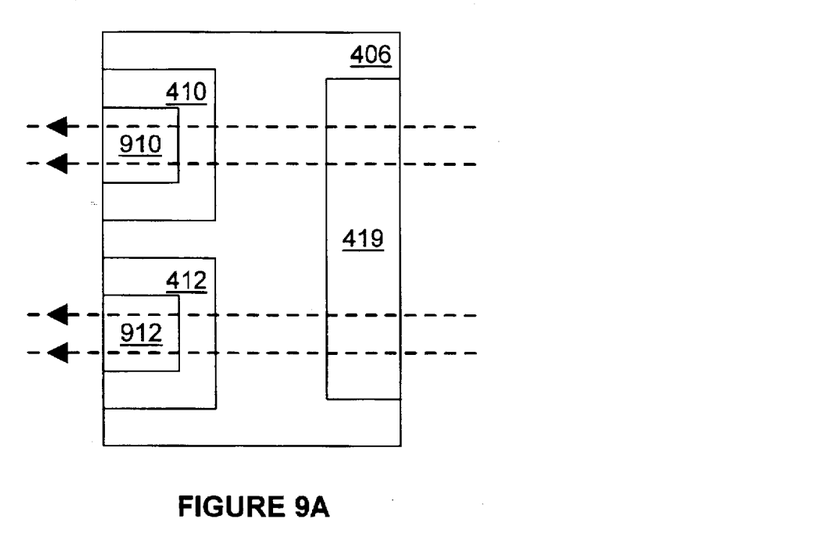
FIG. 9A shows the air flow in a redundant power supply system configuration with a single power supply failure, where the cooling system fans are connected according to the present invention.

The cooling system for the mass storage system serves two functions: cooling the power supplies 410, 412 and cooling the storage devices 419 of the mass storage system 406. Typically, the cooling system for both the storage system 406 and the server 402 is a fan or a plurality of fans, although other means for cooling may be used. Typically, one fan is tied to the OR-ed output of each power supply. FIG. 9A shows the air flow in a redundant power supply system configuration with a single power supply failure, where the cooling system fans are connected according to the present invention. If the cooling system fans are connected as shown in FIG. 9A, air flow is normal during the time it takes to restore redundancy (MTT Restore Redundancy). In the present invention, the corresponding fan or cooling system is active in the event of a power supply failure allowing the normal air circulation for both the operational power supply and the mass storage devices.

During this time, the mass storage cooling is normal and hot air recirculation will not occur.

Figure 9B:
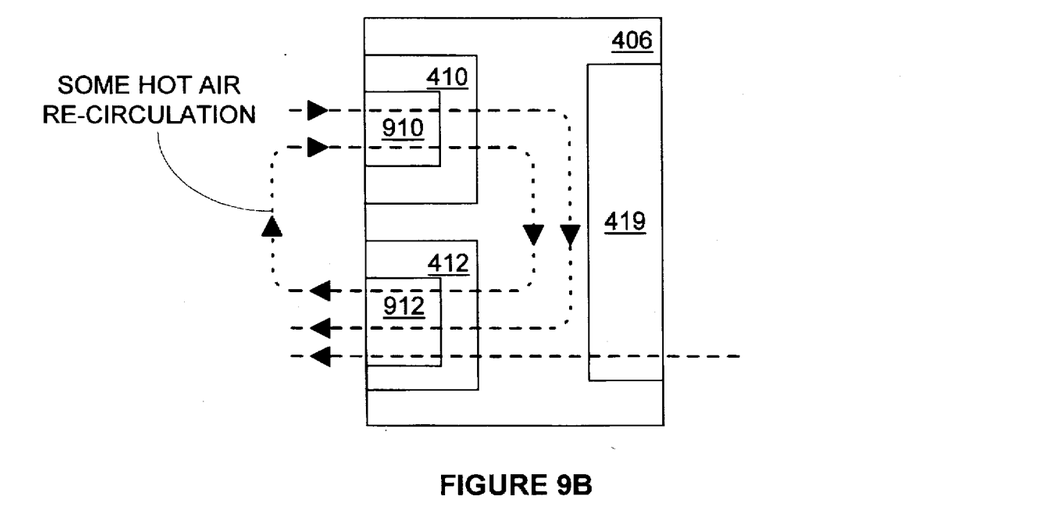
FIG. 9B shows the air flow in a redundant power supply system with a single power supply failure where the cooling system fans are connected internally.

FIG. 9B shows the air flow in a redundant power supply system with a single power supply failure where the cooling system fans are connected internally to the power supply. However, in the event of a power supply failure, the fan associated with that power supply will not continue to run. In other words, if one power supply fails or if one line voltage fails; only one fan is running during the period when the electronic data system is running with one active power supply. Running of one fans when there is only one active power supply, reduces cooling system efficiency as the one remaining fan passes air through the outlet of the non-operating power supply as is shown in FIG. 9B causing some hot air recirculation. This causes the air circulation to effectively bypass the mass storage for cooling purposes.

Hot swapping refers to the process of remove power supply externally from system without turning storage system off. This process is typically done in under two minutes. Applicants believe that the low complexity, low cost system according to the present invention meets the mean time to restore redundancy of one to three days and still gave acceptable system uptime due to power supply failures (estimated as maintaining a 100–1000 times improvement in "uptime" over a non-redundant system if the MTT restore redundancy is 1–3 days). Thus, Applicants believe that hot swapping is not required, and thus is not part of the preferred embodiment although the ability to hot swap may be supported in an alternative embodiment.

It is understood that the above description is intended to be illustrative and not restrictive. The scope of the invention should be determined with reference to the appended claims, along with the full scope of equivalents to which such claims are entitled.

What is claimed is:

1. A redundant power supply interconnect system comprising:
   a first electronic device including a first power supply;
   a second electronic device including a first control means, a second power supply and a third power supply, wherein the second power supply means and the third power supply means are connected to the first control means and provide redundant power supply to the second electronic device and the control means thereof; and
   a first management bus, the first management bus electrically coupling the first electronic device to the control means of the second electronic device,
   wherein the first power supply of the first electronic device is electrically coupled to the control means of the second electronic device via a power bus to provide an additional redundant power supply for the second electronic device.

2. The system recited in claim 1, further including a first dedicated bus electrically coupling the first electronic device to the second electronic device.

3. The system recited in claim 1 wherein the first electronic device and the second electronic device are storage system devices.

4. The system recited in claim 1 wherein the first electronic device is a server and wherein further the first control means of the second electronic device includes a controller, a bus transceiver and a power supply bus.

5. The system recited in claim 4 wherein the controller may be accessed remotely from the server via the first management bus.

6. The system recited in claim 4 further including a memory means for logging system information, said memory means being electrically coupled to said first control means.

7. The system recited in claim 1 further including a third electronic device, the third electronic device including a second control means, a fourth power supply and a fifth power supply,
   wherein the fourth power supply means and the fifth power supply means are connected to the second control means and provide redundant power supply to the third electronic device and the control means thereof; and
   wherein the first power supply of the first electronic device is electrically coupled to the control means of the third electronic device via a power bus to provide an additional redundant power supply for the third electronic device.

8. The system recited in claim 7 further including a second management bus, the second management bus electrically coupling the first electronic device to the third electronic device.

9. The system recited in claim 7 wherein the first control means of the second electronic device is electrically coupled to the second control means of the third electronic device.

10. The system recited in claim 7 further including a further including a first dedicated bus electrically coupling the first electronic device to the second electronic device, and a second dedicated bus electrically coupling the first electronic device to the third electronic device.

11. The system recited in claim 1 further including a UPS electrically coupled between the second power supply and a first power outlet.

12. The system recited in claim 1 further including a first fan and a second fan, the first and second fans used for cooling the second electronic device, the first and second fans being connected internally such that responsive to a power interruption, both the first fan and second fan continue to operate.

13. The system recited in claim 12 wherein the first fan and the second fan are connected so that the first fan is connected to the output of the first power supply and the second fan is connected to the output of the second power supply.

* * * * *